United States Patent
Klaassen et al.

(10) Patent No.: US 11,332,326 B2
(45) Date of Patent: May 17, 2022

(54) PALLETIZER APPARATUS HAVING IMPROVED GRIPPER MECHANISM

(71) Applicant: Barry-Wehmiller, Inc., Green Bay, WI (US)

(72) Inventors: Peter A. Klaassen, Hoek (NL); Willem Zegers, Zaamslag (NL)

(73) Assignee: Barry-Wehmiller, Inc., Green Bay, WI (US)

( * ) Notice: Subject to any disclaimer, the term of this patent is extended or adjusted under 35 U.S.C. 154(b) by 0 days.

(21) Appl. No.: 17/047,331

(22) PCT Filed: Nov. 29, 2018

(86) PCT No.: PCT/US2018/062947
§ 371 (c)(1),
(2) Date: Oct. 13, 2020

(87) PCT Pub. No.: WO2019/203899
PCT Pub. Date: Oct. 24, 2019

(65) Prior Publication Data
US 2021/0163236 A1 Jun. 3, 2021

Related U.S. Application Data

(60) Provisional application No. 62/659,426, filed on Apr. 18, 2018.

(51) Int. Cl.
*B65G 57/06* (2006.01)
*B65G 47/90* (2006.01)
*B65G 57/03* (2006.01)

(52) U.S. Cl.
CPC .......... *B65G 57/06* (2013.01); *B65G 47/902* (2013.01); *B65G 47/907* (2013.01); *B65G 57/03* (2013.01);
(Continued)

(58) Field of Classification Search
CPC .... B65G 47/902; B65G 47/904; B65G 57/03; B65G 57/035; B65G 57/06; B65G 61/00;
(Continued)

(56) References Cited

U.S. PATENT DOCUMENTS 3,312,357 A * 4/1967 Stephens .............. B65G 57/035
414/792.2
4,014,430 A * 3/1977 Beaty, Jr. ............... B65G 57/06
198/588
(Continued)

FOREIGN PATENT DOCUMENTS

EP 0 131 555 A1 1/1985
EP 0 594 476 A1 10/1993
(Continued)

OTHER PUBLICATIONS

International Search Report and Written Opinion dated Feb. 8, 2019.
(Continued)

*Primary Examiner* — Gene O Crawford
*Assistant Examiner* — Keith R Campbell
(74) *Attorney, Agent, or Firm* — Wood, Phillips, Katz, Clark & Mortimer

(57) ABSTRACT

A gripper mechanism for a palletizer apparatus is configured to receive articles from an associated infeed conveyor in any one of a plurality of orientations of the gripper mechanism relative to the infeed conveyor. In a preferred embodiment, the gripper mechanism is configured to receive articles through any one of four sides of the mechanism.

8 Claims, 8 Drawing Sheets

(52) U.S. Cl.
CPC ............... *B65G 2201/0267* (2013.01); *B65G 2811/0663* (2013.01)

(58) Field of Classification Search
CPC ..... B65G 2201/0267; B65G 2811/0663; B25J 9/0093; B25J 15/0014; B25J 15/024; B25J 15/10
See application file for complete search history.

(56) References Cited

U.S. PATENT DOCUMENTS

| | | | | |
|---|---|---|---|---|
| 4,592,692 | A | * | 6/1986 | Suizu ..................... B65G 61/00 294/107 |
| 5,199,845 | A | * | 4/1993 | Hirashima ............... B25J 15/10 294/86.4 |
| 5,338,150 | A | | 8/1994 | Focke et al. |
| 5,551,833 | A | * | 9/1996 | Marsh .................... B65G 57/06 414/793.4 |
| 6,135,704 | A | | 10/2000 | Seaberg |
| 6,658,816 | B1 | * | 12/2003 | Parker .................. B65G 57/005 414/2 |
| 8,414,042 | B2 | * | 4/2013 | Landes ................... B65B 35/16 294/2 |
| 9,610,692 | B2 | | 4/2017 | Guidi et al. |
| 2012/0039699 | A1 | | 2/2012 | Ward et al. |
| 2012/0070263 | A1 | | 3/2012 | Van Schijndel et al. |
| 2014/0369800 | A1 | | 12/2014 | Marks et al. |

FOREIGN PATENT DOCUMENTS

| | | |
|---|---|---|
| EP | 1 452 469 A1 | 2/2004 |
| EP | 2 508 452 A1 | 4/2011 |
| JP | 6-210584 A | 8/1994 |
| NL | 1 000 513 C1 | 12/1996 |
| WO | 2011/158100 A1 | 12/2011 |

OTHER PUBLICATIONS

Dutch National Search Report dated Jan. 16, 2020.
Supplementary European Search Report dated Jan. 7, 2022.

* cited by examiner

PALLETIZER APPARATUS HAVING IMPROVED GRIPPER MECHANISM

CROSS-REFERENCE TO RELATED APPLICATIONS

This application claims priority to U.S. Provisional Ser. No. 62/659,426, filed on Apr. 18, 2018, Appln. No. PCT/US18/62947, filed Nov. 29, 2018 and Netherlands Appln. No. 2022972, filed Apr. 19, 2019, the disclosures of which are hereby incorporated by reference in their entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates generally a palletizer apparatus which is configured to receive articles for stacking in layers on associated pallets, and more particularly to an improved gripper mechanism for a palletizer apparatus which is configured to receive articles from an associated infeed conveyor in any one of a plurality of orientations of the gripper mechanism relative to the infeed conveyor, thus desirably reducing the cycle time required for each of the articles to be handled and positioned by the gripper mechanism.

BACKGROUND OF THE INVENTION

Automated palletizing equipment greatly facilitates handling and palletizing of articles for subsequent storage and shipment. This type of equipment is typically configured for receiving bulk articles or packages, and arranging them in layers on an associated pallet. U.S. Pat. No. 9,610,692, and EP Patents No. 1 452 469, No. 2 508 452, and No. 0 594 476, all hereby incorporated by reference, illustrate palletizer apparatus of this type.

The articles to be palletized are ordinarily conveyed in the palletizer apparatus to a position generally above the associated pallet. A gripper mechanism then operates to receive each article from an associated infeed conveyor, and rotationally orient each article to the desired orientation in a layer on the pallet, while also horizontally positioning the article for the desired positioning on the pallet. Centering elements can be provided within the gripper mechanism for generally centering each article within the mechanism. The "jaws" of the gripper mechanism are then opened so that each article is released and discharged by gravity from the gripper mechanism to the desired position on the pallet. After each layer is completed, the pallet is typically indexed downwardly to permit formation of the next pallet layer.

Considering the large number of articles which may typically be positioned on a single pallet, precise and high-speed operation of the palletizer promotes efficiency. One aspect of the above type of mechanism typically requires movement of the gripper mechanism to its initial orientation, relative to the associated infeed conveyor, in order for the next successive article to be received by the gripper mechanism. This re-orientation is required because the typical gripper mechanism is configured such that the mechanism must be in a single, predetermined orientation relative to the infeed conveyor to receive articles within the gripper mechanism.

The present invention promotes efficient, high-speed operation of a palletizer apparatus by the provision of a gripper mechanism which is configured to receive articles therein in any one of a plurality of orientations relative to the associated infeed conveyor, that is, for receiving articles from more than one side of the gripper mechanism.

SUMMARY OF THE INVENTION

An improved gripper mechanism for a palletizer apparatus promotes efficient, high-speed handling of articles for palletizing by precluding the need for the gripper mechanism to be returned to a single, predetermined orientation relative to an associated infeed conveyor for receiving each article in the gripper mechanism. In the preferred embodiment, the gripper mechanism is configured to receive articles through any one of the four sides of the mechanism, thereby desirably reducing the cycle time required for returning the gripper mechanism to a position and orientation for receiving the next successive article from the infeed conveyor. However, it is within the purview of the present invention to provide a gripper mechanism that can receive articles from more than one side thereof by configuring the gripper mechanism to receive articles from either selected one of opposite sides of the mechanism.

In accordance with the illustrated embodiments, a gripper mechanism for a palletizer apparatus comprises a support frame positioned in the palletizer apparatus for movement along an X-axis and a Y-axis. A rotary drive is provided for rotatably driving the support frame to selectively rotatably positioning the gripper mechanism.

First, second, third and fourth gripper members are mounted on the support frame for movement between closed and opened positions. Notably, each adjacent pair of the gripper members define an infeed opening for receiving articles to be palletized from an associated infeed conveyor. Thus, a plurality of openings are defined by the gripper mechanism for receiving articles from the infeed conveyor.

The present gripper mechanism further includes at least one actuator for moving the gripper members to the opened positions. This permits an article received on the gripper members to be released by gravity onto an associated pallet, after the rotary drive rotatably positions the support frame to the desired orientation relative to the pallet.

Thereafter, the gripper members are moved to their closed positions. Because the gripper mechanism defines a plurality infeed openings between adjacent ones of the gripper members, the gripper mechanism can thereafter receive another one of the articles through one of the infeed openings, without the rotary drive rotating the gripper mechanism. Thus, the gripper mechanism is configured to receive the next successive article without the gripper mechanism being returned to any one particular orientation with respect to the infeed conveyor. Reduced cycle times are thus desirably achieved.

In accordance with the illustrated embodiment, the gripper members of the gripper mechanism are simultaneously moved pivotally, in pairs, for dropping one of the articles onto said associated pallet. Specifically, in one mode of operation, the first and second gripper members are pivotally movable together, while the third and fourth gripper members are pivotally movable together, for releasing one of articles received from the infeed conveyor by gravity from the gripper mechanism onto an associated pallet. In an alternative mode, the first and fourth gripper members are also pivotally movable together, and the second and third gripper members pivotally movable together, for releasing an article received from said infeed conveyor by gravity from the gripper mechanism onto an associated pallet. Thus, selected opposing pairs of the gripper members are operated for releasing each article from the gripper mechanism, depending upon the orientation of the gripper mechanism relative to the desired positioning of the gripper mechanism relative to the associated pallet, so that each article can be placed in the desired position and orientation on the successive layers of the pallet being formed.

At least one actuator is provided for moving the gripper members in pairs. Preferably, two pairs of such actuators are provided, which permits adjacent pairs of the gripper members to be selectively moved away from another adjacent pair to permit an article to be dropped and discharged from the gripper mechanism.

Because the gripper mechanism defines an infeed opening at each of its four sides, between each adjacent pair of gripper members, minimal if any rotational re-orientation of the gripper mechanism is required for receiving the next article from the infeed conveyor. The cycle time for handling each article is thus desirably reduced, promoting efficiency.

In the preferred form, the present gripper mechanism includes first and second pairs of centering elements positioned in respective association inwardly of the gripper members of the mechanism. Opposing ones of the centering elements are movable toward each other for centering an article received from the infeed conveyor in the gripper mechanism.

Each of the centering elements is movable between raised and lowered positions. The centering elements are operated such that opposing ones of the centering are in the lowered position for movement toward each other for centering an article in the gripper mechanism. To permit articles to be received from any of the sides of the gripper mechanism, each one of the centering elements is movable to the raised positioned for receiving an article from the infeed conveyor through the one of the infeed openings aligned with that one of the centering elements.

The specific configuration of the gripper members can be varied in accordance with the present invention. Pneumatic and/or electro-mechanical actuators can be employed for operating the components of the present gripper mechanism.

In an arrangement having two gripper members, rather than four, the mechanism can be configured to define first and second infeed openings at opposite ends of the gripper mechanism. The gripper mechanism can thus receive articles from more than one side of the gripper mechanism, i.e., from opposite ends thereof. Improved cycles times can be achieved.

Other features and advantages of the present invention will be readily apparent from the following detailed description, the accompanying drawings and the appended claims.

Figure 1:
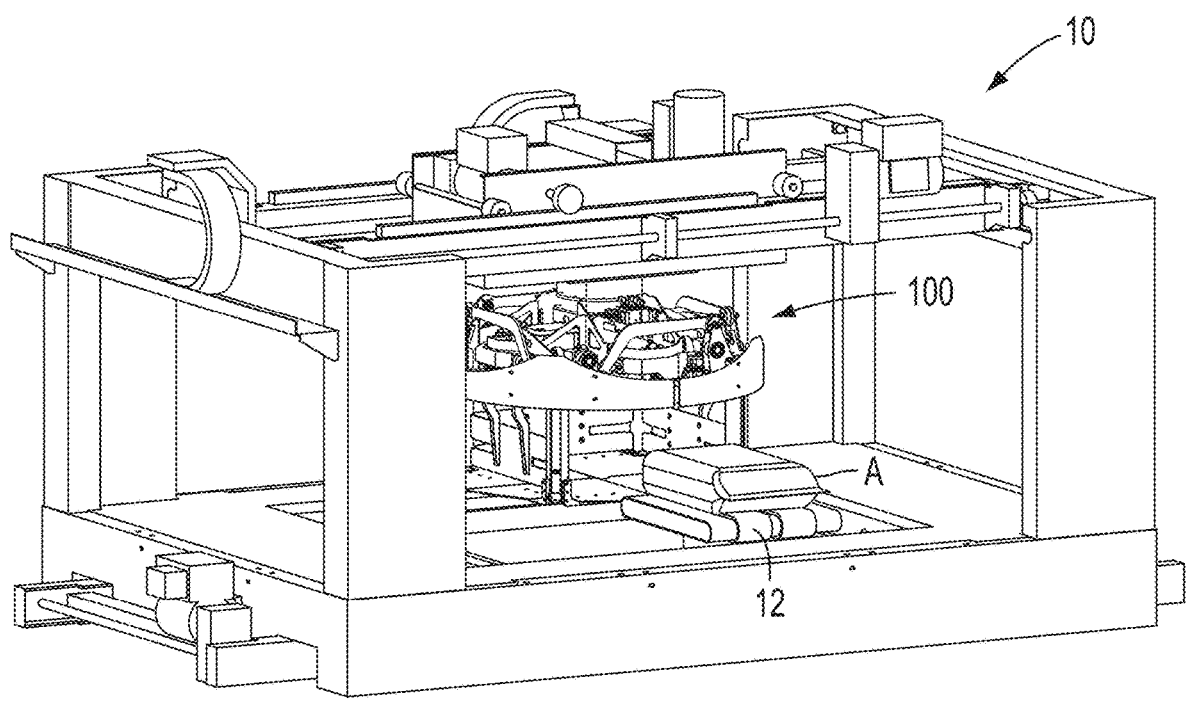
FIG. 1, is a diagrammatic view of a palletizer apparatus having a gripper mechanism embodying the principles of the present invention, which is configured to receive articles to be palletized from an associated infeed conveyor.

Other features and advantages of the present invention will be readily apparent from the following detailed description, the accompanying drawings, and the appended claims.

DETAILED DESCRIPTION OF THE PREFERRED EMBODIMENT

While the present invention is susceptible of embodiment in various forms, there is shown in the drawings and will hereinafter be described a presently preferred embodiment, with the understanding that the present disclosure should be considered as an exemplification of the invention, and is not intended to limit the invention to the specific embodiments illustrated.

An improved gripper mechanism, designated 100, fora palletizer apparatus 10 promotes efficient, high-speed handling of articles A for palletizing by precluding the need for the gripper mechanism to be returned to a single, predetermined orientation relative to an associated infeed conveyor 12 for receiving each article in the gripper mechanism. In the preferred embodiment, the gripper mechanism 100 is configured to receive articles through any one of the four sides of the mechanism, thereby desirably reducing the cycle time required for returning the gripper mechanism to a position and orientation for receiving the next successive article from the infeed conveyor 12. However, it is within the purview of the present invention to provide a gripper mechanism that can receive articles from more than one side thereof by configuring the gripper mechanism to receive articles from either selected one of opposite ends of the mechanism.

In accordance with the illustrated embodiment, a gripper mechanism 100 for the palletizer apparatus 10 comprises a support frame 102 positioned in the palletizer apparatus 10 for movement along an X-axis and a Y-axis. A rotary drive 104 is provided for rotatably driving the support frame 102 to selectively rotatably position the gripper mechanism 100. Notably, a gripper mechanism 100 configured in accordance with the present invention can be sized for fitting and operation in an apparatus 10 generally like existing devices.

First, second, third and fourth gripper members, each designated 106, are mounted by vertical supports 108 on the support frame 102 for movement between closed (FIG. 2) and opened (FIG. 6) positions. Notably, each adjacent pair of the gripper members 106 define an infeed opening, generally between the adjacent vertical supports 108, for receiving articles to be palletized from the associated infeed conveyor 12. Thus, a plurality of openings are defined by the gripper mechanism 100 for receiving articles from the infeed conveyor 12.

Figure 2:
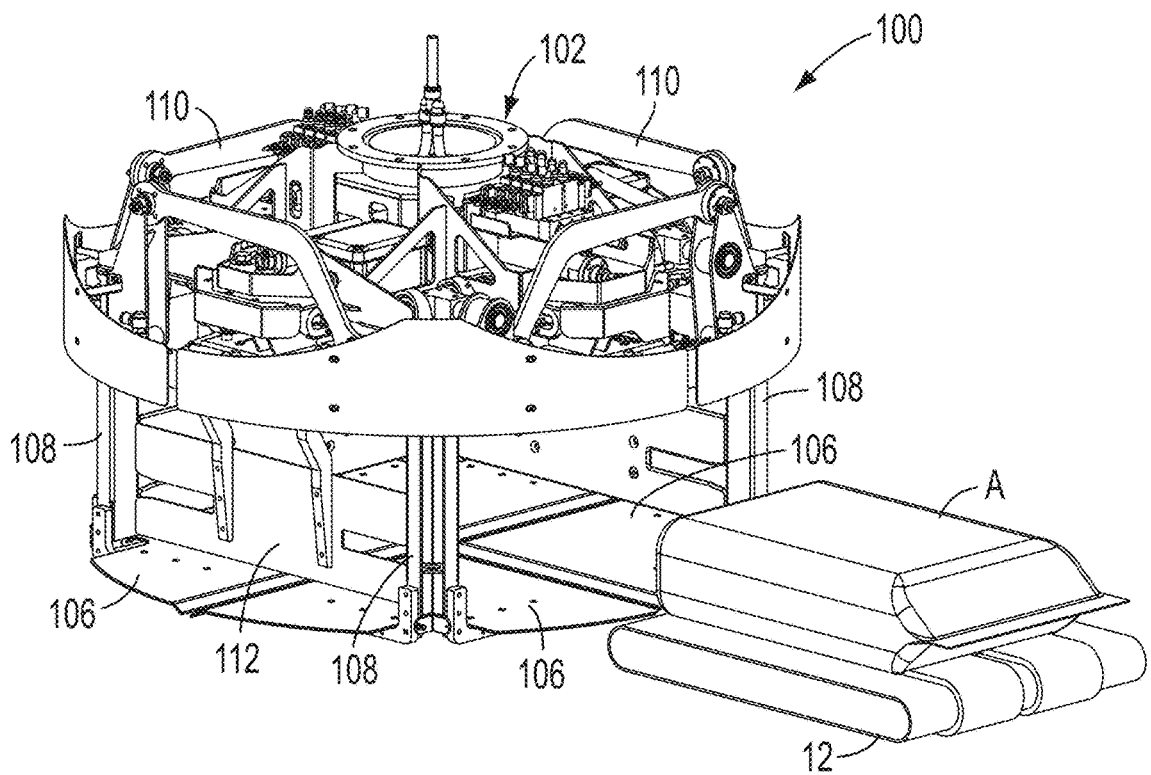
FIG. 2 is a diagrammatic view of the present gripper mechanism, shown in an orientation for receiving an article from the associated infeed conveyor.
Figure 3:
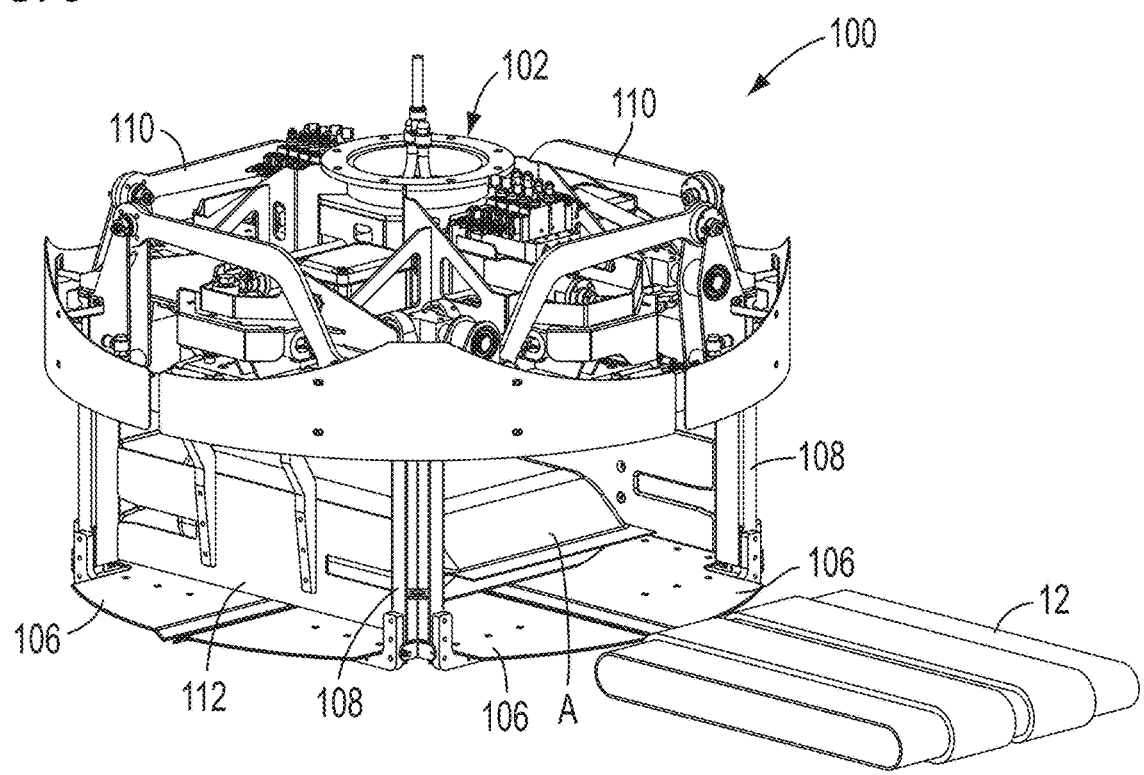
FIG. 3 is a diagrammatic view of the present gripper mechanism, shown having received an article, illustrated as a bag, from the associated infeed conveyor.

The present gripper mechanism 100 further includes at least one actuator 109 for moving the gripper members 106 to the open positions. This permits an article received from the infeed conveyor 12 on the gripping members 106 to be released by gravity onto the associated pallet, after the rotary drive 104 rotatably positions the support frame 102 to the desired orientation relative to the pallet. FIGS. 2 and 3 illustrate the gripper members 106 in their closed positions for receiving an article thereon from the associated infeed conveyor 12.

In the illustrated embodiment, the gripper members 106 of the gripper mechanism 100 are simultaneously moved pivotally, in adjacent pairs, for dropping one of the articles A onto the associated pallet. The desired movement of the gripper members 106 is effected by linear actuators 109, with four (4) such actuators provided. Additionally, linkages 110 extend between each adjacent pair of the gripper members 106, with dual-axis pivot assemblies 111 provided on which the gripper members are mounted for pivotal movement. The pivot assemblies function in the nature of a "double-hinge" or a universal joint, to permit opposite pairs of the gripper members to open for releasing an article for stacking on the associated pallet.

Figure 12:
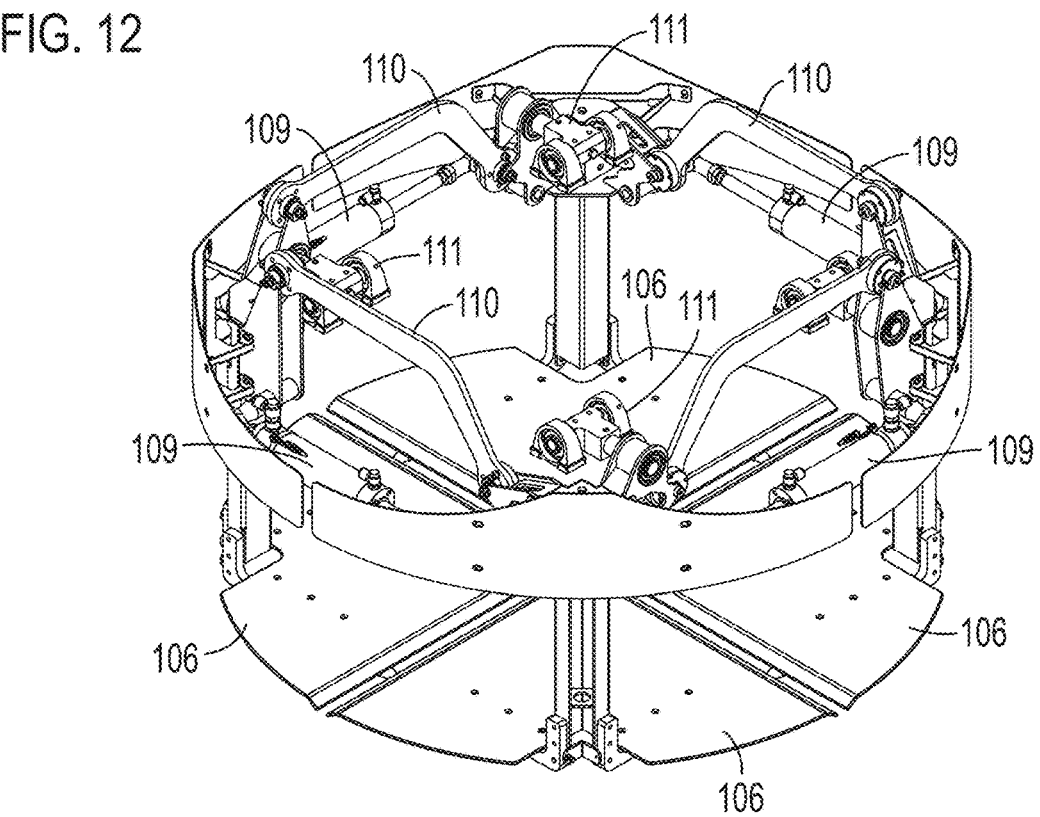
FIG. 12 is a diagrammatic view of the gripper members of the present gripper mechanism, shown in a closed orientation.
Figure 13:
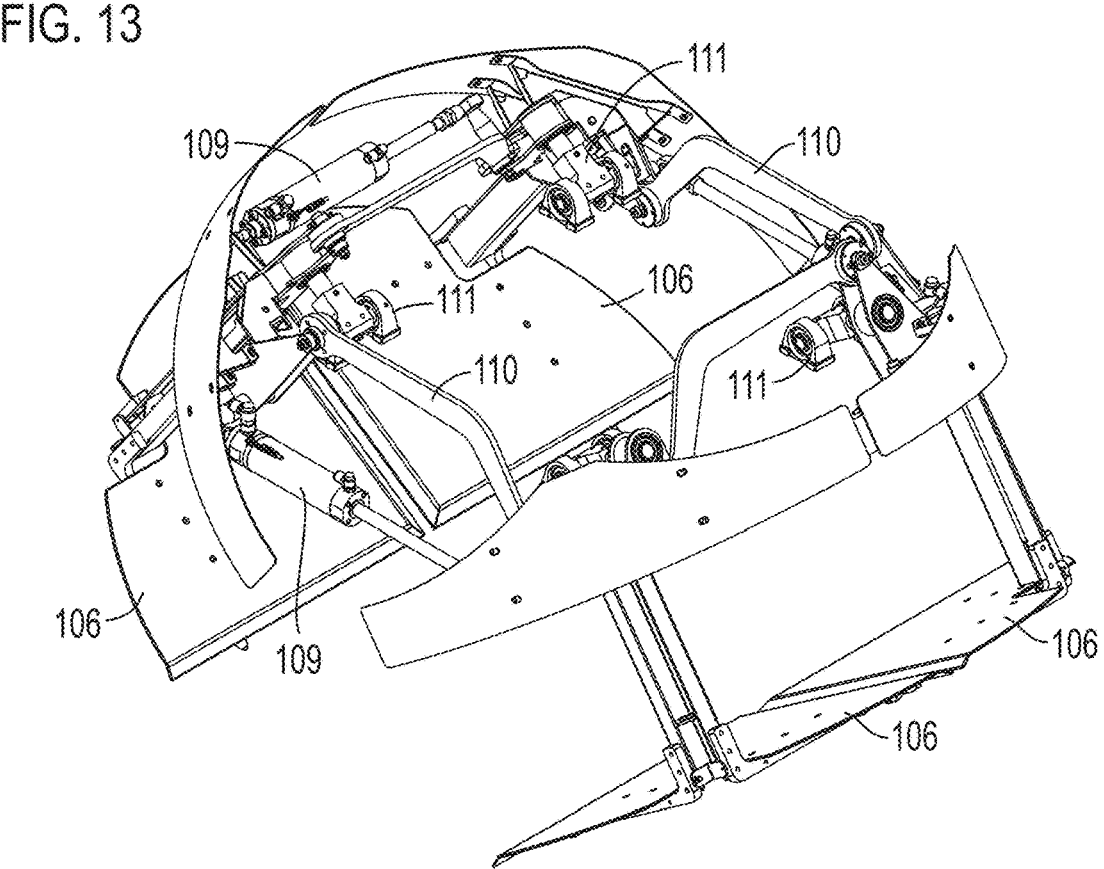
FIG. 13 is a diagrammatic view of the gripper members of this embodiment of the present gripper mechanism, with first and second ones of the gripper members, and third and fourth ones of the gripper members, pivotally moved in pairs.
Figure 14:
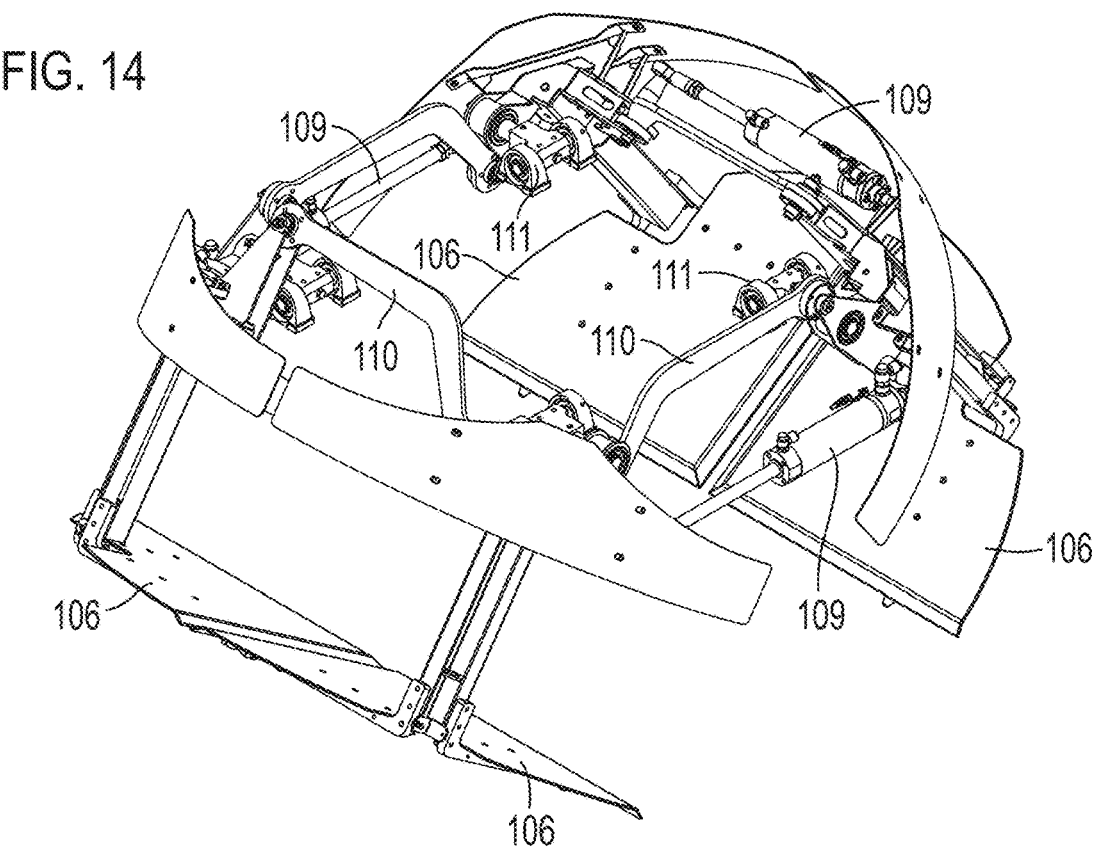
FIG. 14 is a diagrammatic view of the gripper members of this embodiment of the present gripper mechanism, with first and fourth ones of the gripper members, and second and third ones of the gripper members, pivotally moved in pairs.

FIGS. 12, 13, and 14 illustrate the manner in which adjacent ones of the gripper members 106 are moved by actuators 109 about the dual-axis pivot assemblies 111. FIG. 12 shows the gripper members 106 in the closed position. FIG. 13 shows the gripper members 106 in an open condition, with first and second ones of the gripper members, and third and fourth ones of the gripper members, pivotally moved in pairs. FIG. 14 shows the gripper members 106 in an alternative open condition, with first and fourth ones of the gripper members, and second and third ones of the gripper members, pivotally moved in pairs.

Thus, depending upon the orientation in which the article A is received within the gripper mechanism 100, opposing pairs of the gripper members 106 are moved apart for dropping the article from within the gripper mechanism onto the associated pallet.

It will be appreciated that while in the illustrated embodiment, the gripper members 106 are mounted on the support frame 102 for pivotal movement for releasing an article from within the gripper mechanism, it is within the purview of the present invention to configure the gripper members for other than pivotal movement, such as linear movement for effecting article release. A suitable number of actuators can be employed for effecting the desired simultaneous movement of the gripping members 106, and such actuators can be either pneumatically or electrically driven.

Figure 11:
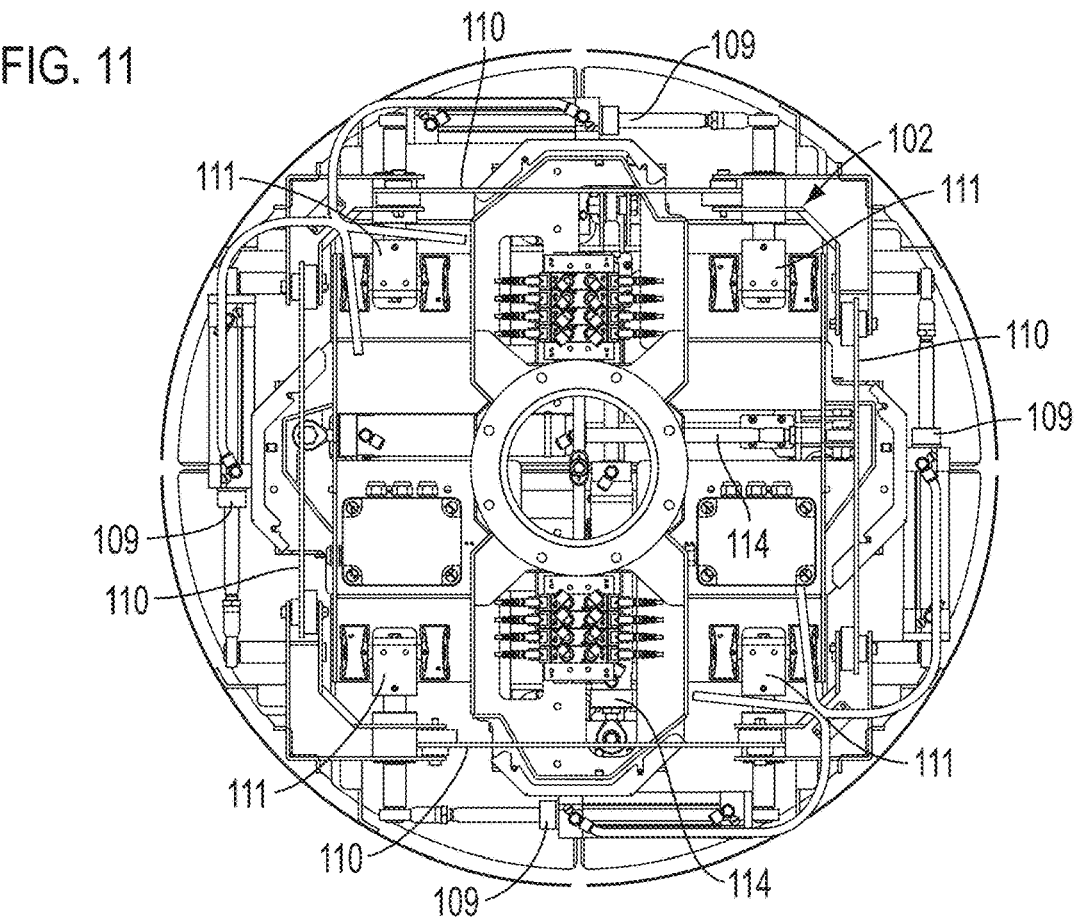
FIG. 11 is a diagrammatic, top plan view of the present gripper mechanism.

In the preferred form, the present gripper mechanism 100 includes first and second pairs of centering elements 112 positioned in respective association inwardly of the gripper members 106 of the mechanism. Opposing ones of the centering elements 112 are movable toward each other, by centering actuators 114 (see FIG. 11), for centering an article received from the infeed conveyor 12 in the gripper mechanism 100. Suitable timing belts are provided so that each opposite pair of the centering elements cooperate to effect the desired centering or centralizing of each article A within the gripper mechanism.

Figure 15:
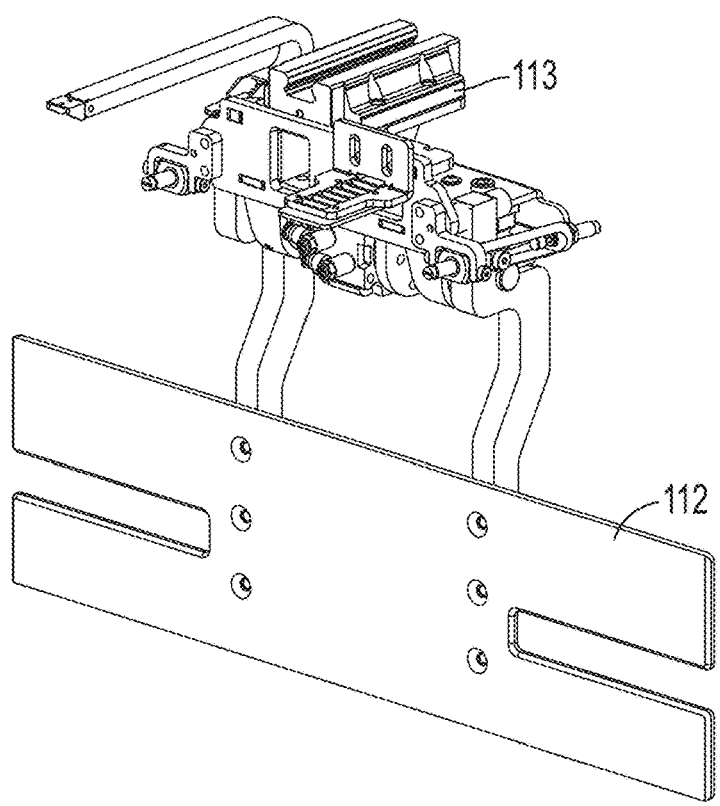
FIG. 15 is a diagrammatic view of one centering element of the present gripper mechanism.

FIG. 15 illustrates one of the centering elements 112. Each centering element 112 is mounted a carrier 113 for linear movement with respect to the support frame 102, such that opposite ones of the centering elements are moved toward and away from each other by the respective linear actuator operatively extending between that pair of centering elements. Thus, either opposite pair of the centering elements can be moved toward each other for centering an article received in the gripper mechanism 100, thus ensuring precise and accurate placement of the article on the pallet being formed.

Each of the centering elements 112 is movable between raised and lowered positions by a respective actuator. FIG. 15 illustrates the centering element 112 in its lowered position, with any one of the centering elements being selectively pivotally moveable, in a generally inward and upward direction, to permit an article A to be received on the gripper mechanism 100 from any side of the mechanism, that is, between any adjacent pair of the vertical supports 108 of the gripper members 106. Thus, the centering elements 112 are operated such that opposing ones of the centering elements 112 are in the lowered position for movement toward each other for centering the article A in the gripper mechanism 100. To permit articles to be received from any of the sides of the gripper mechanism 100, a selected one of the centering elements 112 is movable to the raised position for receiving an article from the infeed conveyor through the one of the infeed openings aligned with the raised one of the centering elements 112.

Typical operation of the present gripper mechanism will now be described.

FIG. 2 illustrates the gripper mechanism 100 in position for receiving an article A from the associated infeed conveyor 12. It will be noted that all four of the gripper members 106 are in their closed orientations for receiving the article thereon. The centering element 112 positioned generally adjacent to the infeed conveyor is not visible because it is in its raised position so that that article can be received by movement between the vertical supports 108 which generally flank the infeed conveyor.

FIG. 3 shows the article A having been received within the gripper mechanism 100, but prior to centering of the article by opposed centering elements 112. FIG. 3 shows centering elements 112 in the same position illustrated in FIG. 2.

Figure 4:
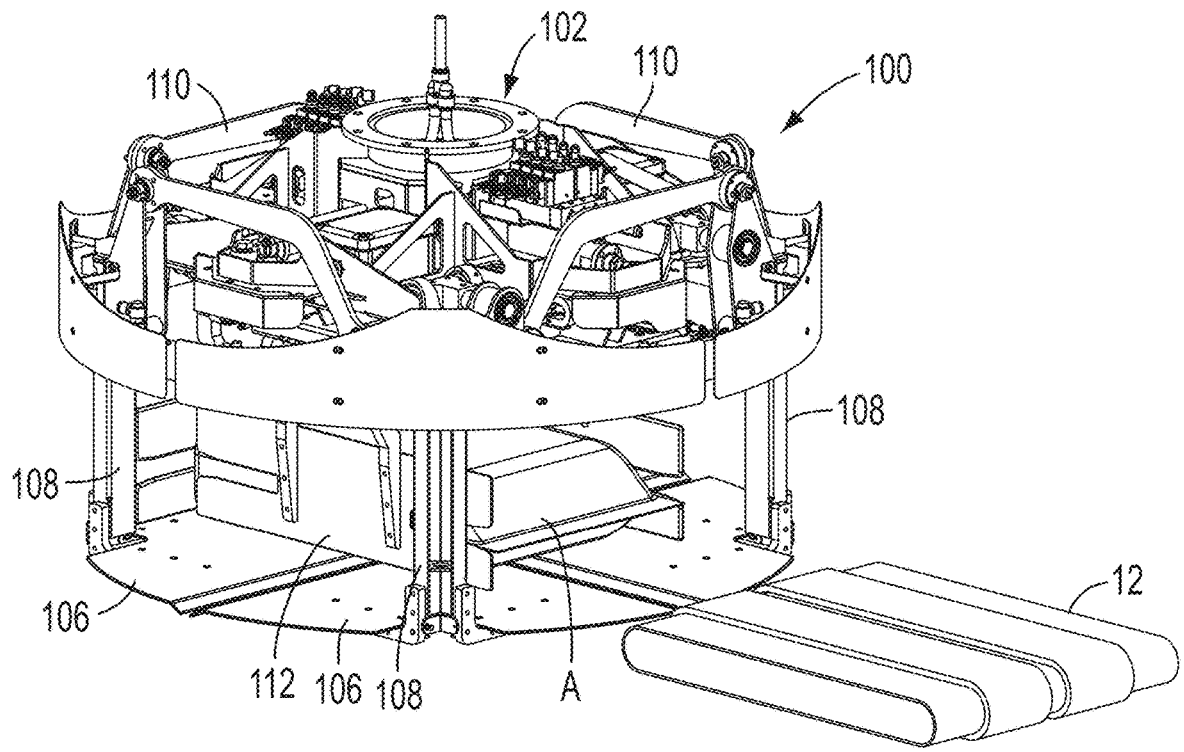
FIG. 4 is a diagrammatic view of the present gripper mechanism, shown centering and centralizing the article received from the associated infeed conveyor.
Figure 5:
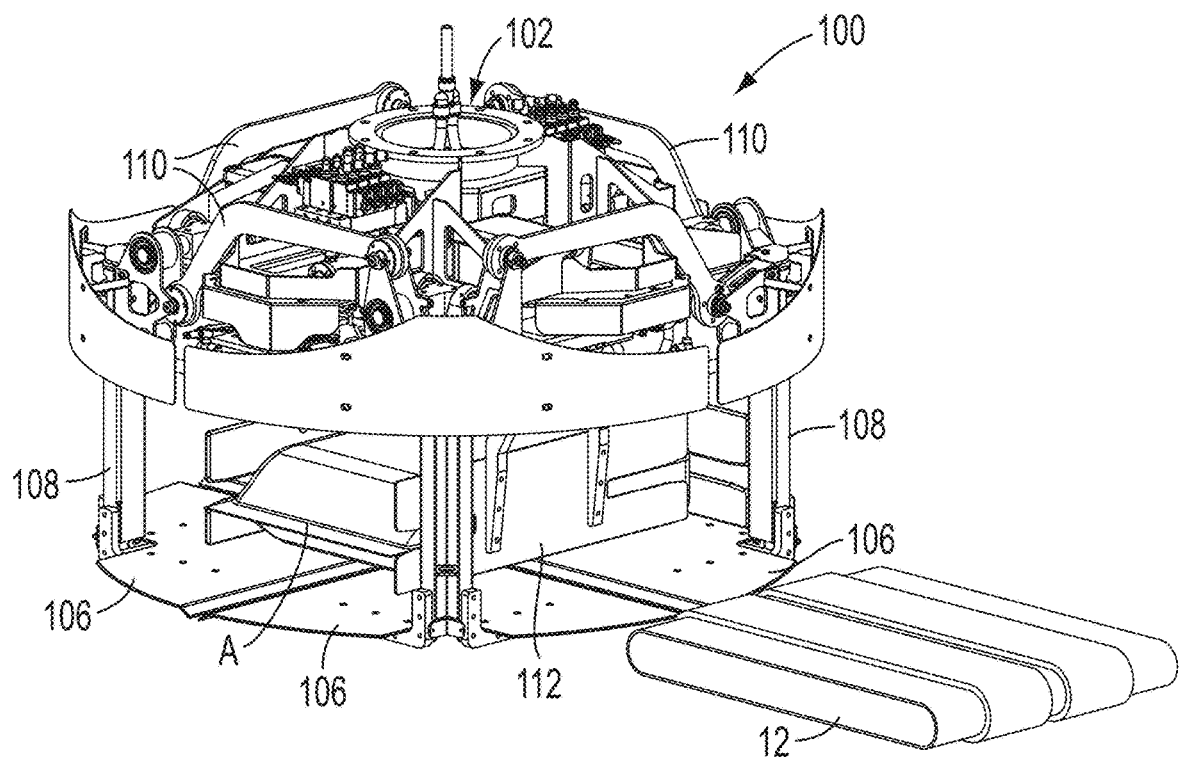
FIG. 5 is a diagrammatic view of the present gripper mechanism, showing rotation of the gripper mechanism into position above an associated pallet.

In contrast, FIG. 4 illustrates opposing ones of the centering elements 112 being operated to center the article A on the closed gripper members 106. FIG. 5 illustrates rotational positioning of the gripper mechanism, with an article A carried thereby, for positioning the article in the desired orientation relative to the pallet being loaded.

Figure 6:
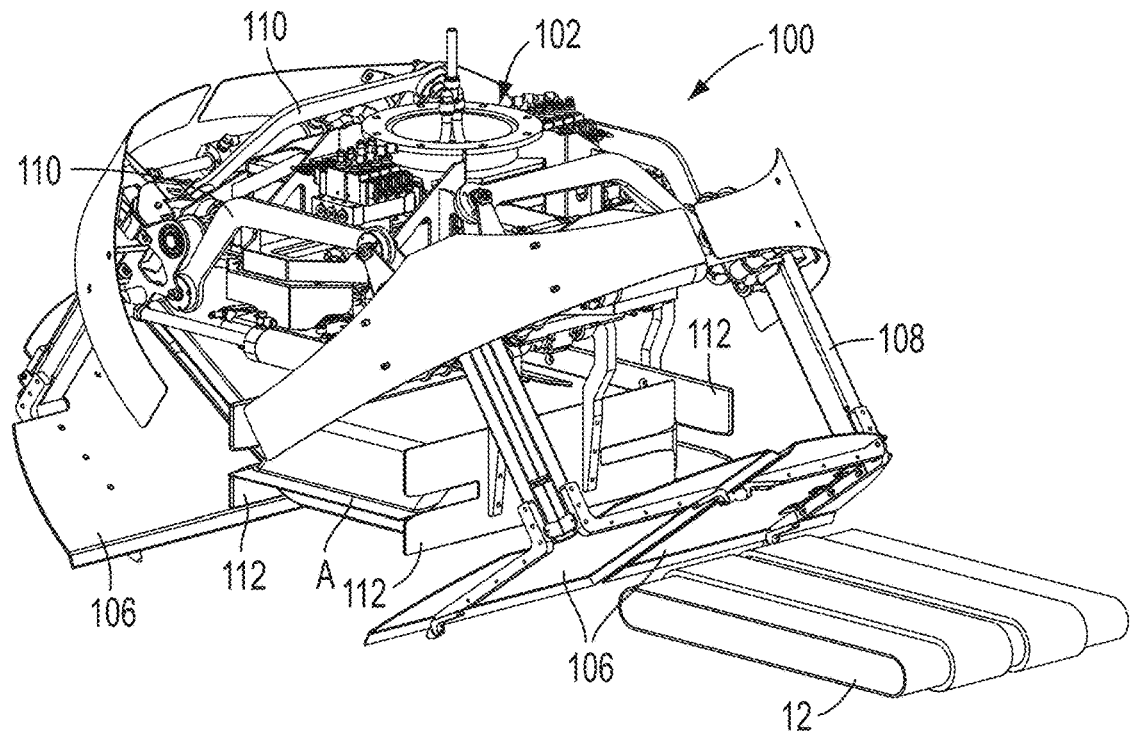
FIG. 6 is a diagrammatic view of the present gripper mechanism, showing opening of gripper members of the mechanism.
Figure 7:
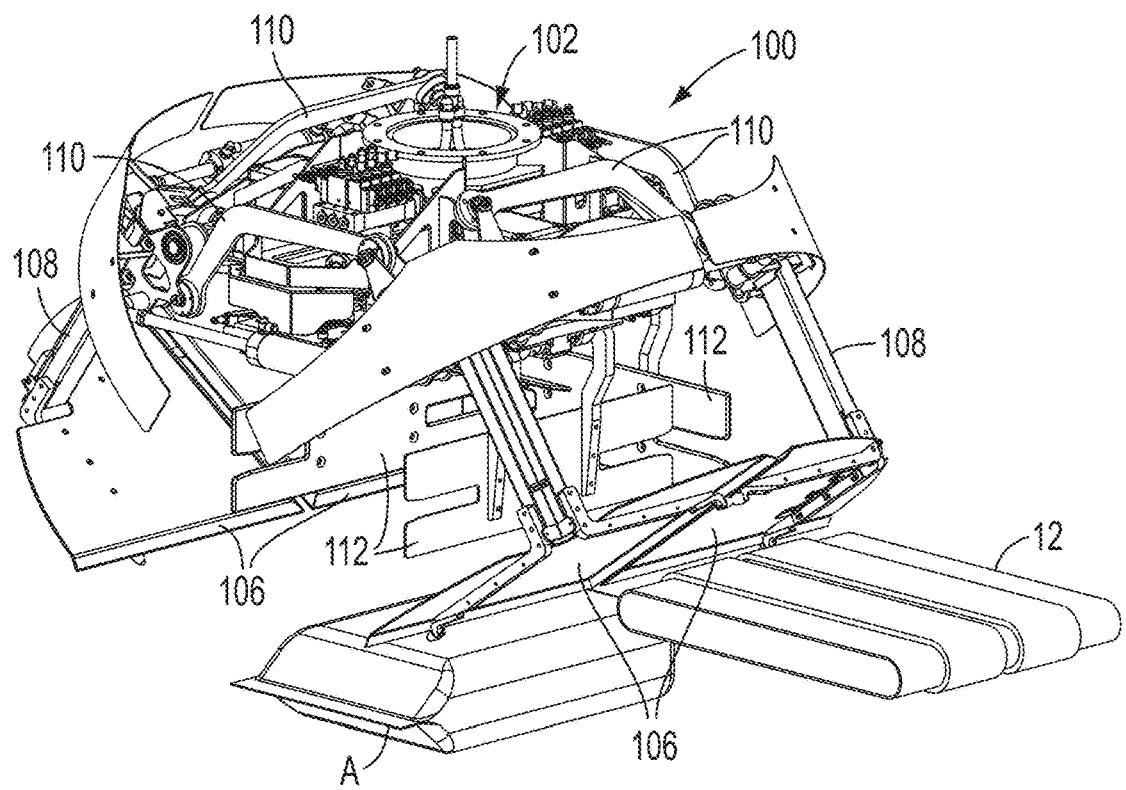
FIG. 7 is a diagrammatic view of the present gripper mechanism, showing the article being dropped from the mechanism onto the associated pallet.

FIGS. 6 and 7 illustrate operation the gripper members 106 to their open positions for releasing the article A by gravity from the gripper mechanism so that the article is deposited in the desired position and orientation on the associated pallet. The article is dropped from its position between the centering elements 112 which had been operated to center the article prior to opening of the gripper members 106.

Figure 8:
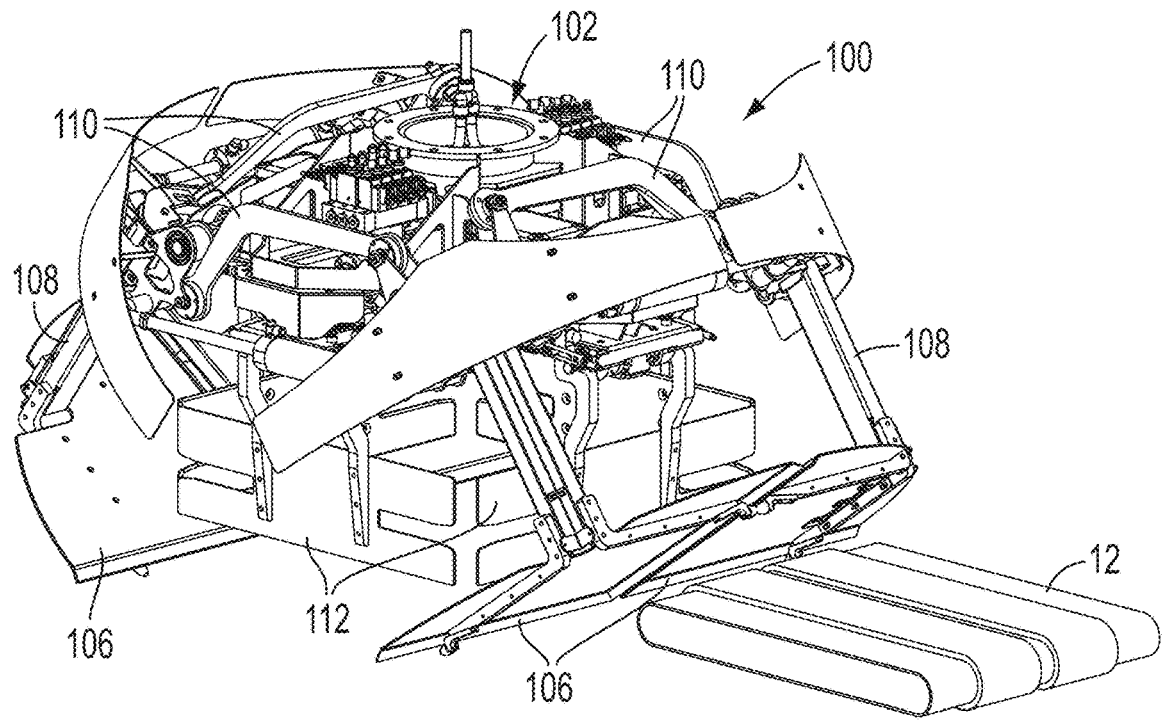
FIG. 8 is a diagrammatic view of the present gripper mechanism, showing the mechanism closing to receive another article from the associated infeed conveyor.
Figure 9:
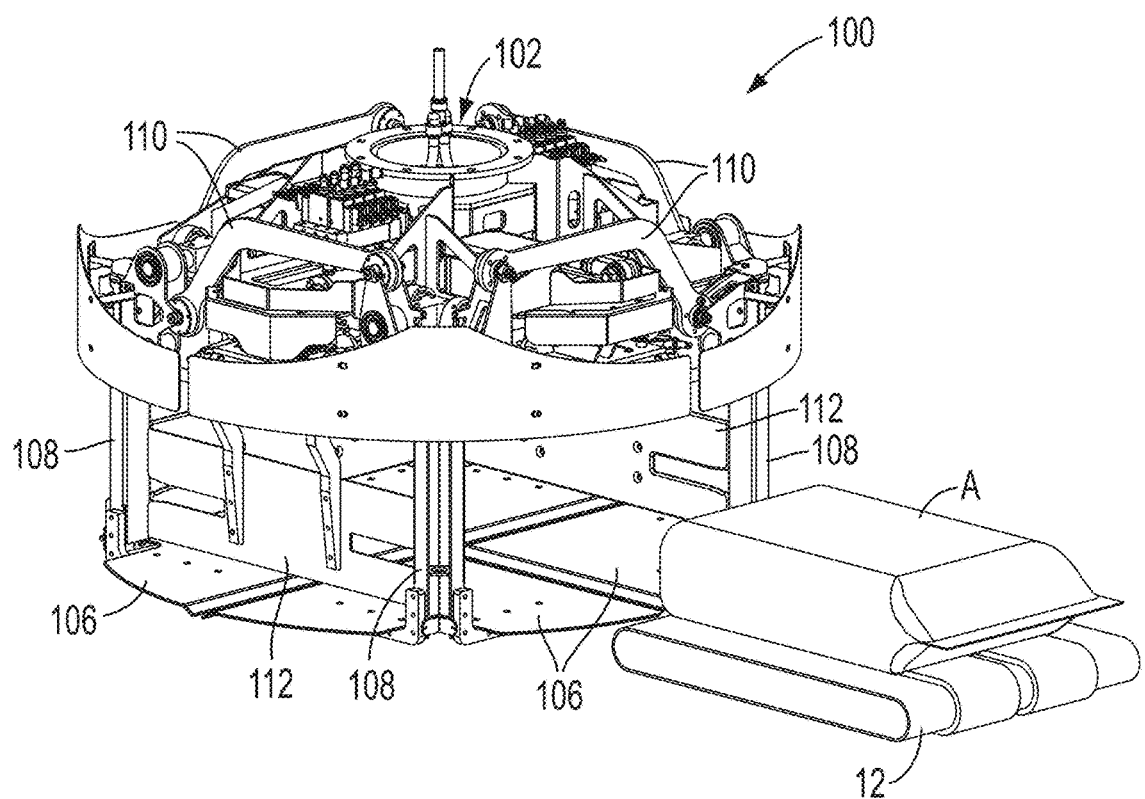
FIG. 9 is a diagrammatic view of the present gripper mechanism, showing the mechanism back in a position and orientation for receiving another article from the associated infeed conveyor.
Figure 10:
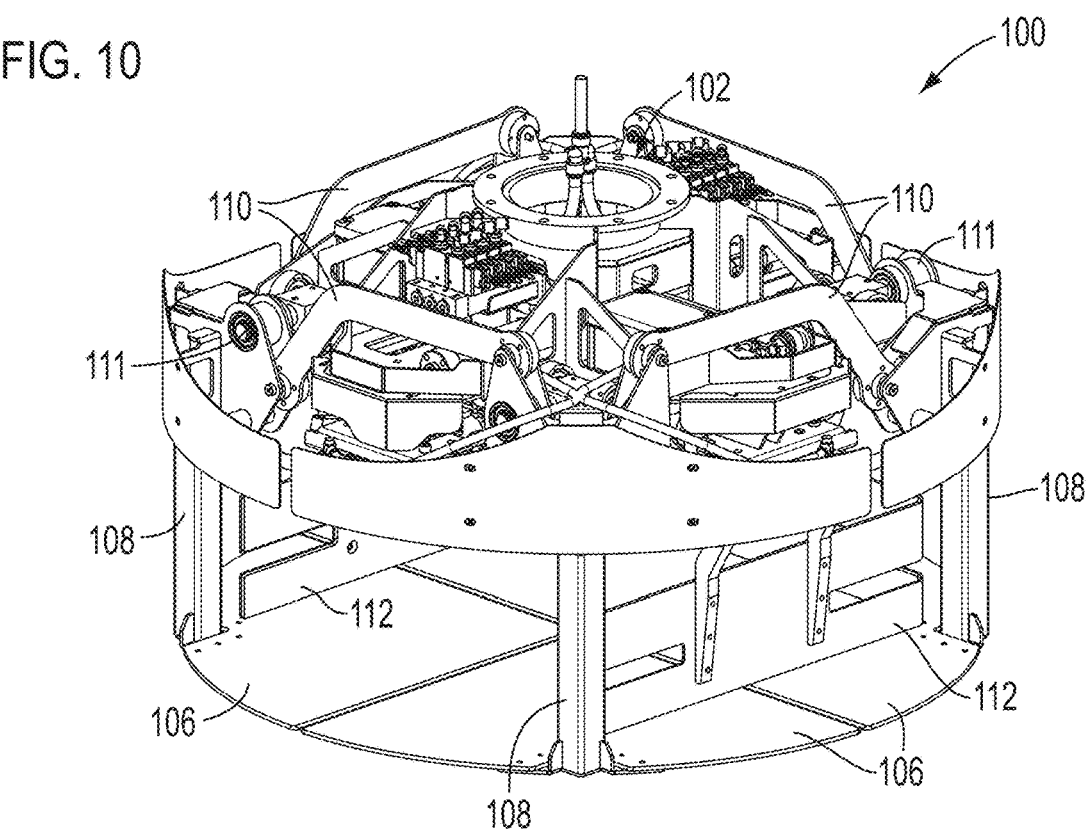
FIG. 10 is a diagrammatic, isometric view of the present gripper mechanism.

FIGS. 8 and 9 illustrate the gripper mechanism 100 after the article A has been released, with the gripper mechanism being configured to receive the next successive article from the infeed conveyor 12. As shown in FIG. 8, all of the centering members are in their lowered positions, and are positioned away from each other so that the next article can be received in the gripper mechanism. Notably, no rotational movement of the gripper mechanism need be effected, since the arrangement is configured to receive an article from any one of its four sides, between adjacent ones of the vertical supports 108 of the gripper members 106.

FIG. 9 shows gripper members 106 in the closed orientation for receiving the next article A from the infeed conveyor 12. To this end, the one of the centering elements 112 positioned at and confronting the infeed conveyor 12 is moved to its raised position. The gripper members 106 are in to their closed positions for receiving the next article from the infeed conveyor through the opening defined between the vertical supports 108 of adjacent ones of the gripper elements 106. Thus, as shown in FIG. 9, the next article is ready to be received in the gripper mechanism 100 on the gripper members 106. As will be appreciated, this operation of the gripper mechanism 100 is achieved without rotational repositioning of the gripper mechanism in any particular, predetermined orientation of the gripper mechanism with respect to the infeed conveyor 12. By avoiding the need to rotationally reposition the gripper mechanism, reduced cycle times are desirably achieved for receiving, orienting, and positioning the next successive package.

Thus, because the gripper mechanism 100 defines a plurality infeed openings between adjacent ones of the gripping members 106, the gripper mechanism can thereafter receive another one of the articles through any one of the infeed openings, without the rotary drive 104 rotating the gripper mechanism 100.

In an arrangement having two gripper members, rather than four, the mechanism can be configured to define first and second infeed openings at opposite ends of the gripper mechanism. The gripper mechanism can thus receive articles from more than one side of the gripper mechanism, i.e., from opposite ends thereof. Improved cycles times can be achieved.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

The invention claimed is:

1. A gripper mechanism (100) for a palletizer apparatus (10), said gripper mechanism (100) comprising:
    a support frame (102) positioned in said palletizer apparatus (10) for movement along an X-axis and a Y-axis;
    a rotary drive (104) for rotatably driving said support frame (102),
    first, second, third and fourth gripper members (106) mounted on said support frame (102) for movement between closed and opened positions, wherein adjacent pairs of said gripper members (106) define four different infeed openings, each for receiving articles (A) to be palletized from an associated infeed conveyor (12) configured to advance articles (A) into each of the infeed openings; and
    at least one actuator (109) for moving said gripper members (106) to said open positions to permit an article (A) received on said gripper members (106) to be released by gravity onto an associated pallet after said rotary drive (104) rotatably positions said support frame (102), said gripper members (106) thereafter being moved to said closed positions, said gripper mechanism (100) thereafter configured to receive another one of said articles (A) between adjacent ones of said gripper members (106) without said rotary drive (102) rotating said gripper mechanism (100).

2. A gripper mechanism (100) for a palletizer apparatus (10) in accordance with claim 1, wherein
    said gripper members (106) are simultaneously moved for releasing said one of said articles (A) onto said associated pallet.

3. A gripper mechanism (100) fora palletizer apparatus (10) in accordance with claim 1, wherein
    said first and second gripper members (106) are pivotally movable together as one piece, and said third and fourth gripper members are pivotally movable together as one piece, for releasing one of articles (A) received from said infeed conveyor (12) by gravity from said gripper mechanism (100) onto an associated pallet; and
    said first and fourth gripper members (106) are pivotally movable together as one piece, and said second and third gripper members (106) are pivotally movable together as one piece, for releasing an article (A) received from said infeed conveyor (12) by gravity from said gripper mechanism (100) onto an associated pallet.

4. A gripper mechanism (100) for a palletizer apparatus in accordance with claim 1, including
    first and second pairs of centering elements (112) positioned in respective association inwardly of said gripper members (106), opposing ones of said centering elements (11) being movable toward each other for centering an article (A) received from said infeed conveyor (12) in said gripper mechanism (100),
    each of said centering elements (112) being movable between raised and lowered positions, wherein opposing ones of said centering elements (112) are in said lowered position for movement toward each other for centering an article (A) in said gripper mechanism (100),
    each one of said centering elements (112) being movable to said raised position for receiving an article (A) from said infeed conveyor (12) through the one of said infeed openings aligned with that one of said centering elements (112).

5. A gripper mechanism (100) for a palletizer apparatus (12), said gripper mechanism (100) comprising:
    a support frame (102) positioned in said palletizer apparatus (12) for movement along an X-axis and a Y-axis;
    a pair of gripper members (106) mounted on said support frame (102) for movement between closed and opened positions, wherein said gripper members (106) define a pair of spaced, opposite infeed openings for receiving articles (A) to be palletized from an associated infeed conveyor (12); and at least one actuator (109) for moving said gripper members (106) between opened and closed positions, so that in said closed position said gripper mechanism (100) can receive one of said articles (A) in either one of said openings from more than one side of said gripper mechanism (100), and in said opened position an article received in said gripper mechanism (100) can be discharged by gravity from said gripper mechanism (100) onto an associated pallet.

6. The gripper mechanism (100) for a palletizer apparatus (10) in accordance with claim 1, wherein the first and second gripper members (106) are configured to cooperatively define an upwardly facing support for receiving articles (A) to be palletized from one associated infeed conveyor (12).

7. The gripper mechanism (100) for a palletizer apparatus (10) in accordance with claim 5, wherein the pair of gripper members (106) are configured to cooperatively define an upwardly facing support for receiving articles (A) to be palletized from the associated infeed conveyor (12).

8. The gripper mechanism (100) for a palletizer apparatus (10) in accordance with claim 5, including
first and second pairs of centering elements (112) positioned in respective association inwardly of said gripper members (106), opposing ones of said centering elements (11) being movable toward each other for centering an article (A) received from said infeed conveyor (12) in said gripper mechanism (100),
each of said centering elements (112) being movable between raised and lowered positions, wherein opposing ones of said centering elements (112) are in said lowered position for movement toward each other for centering an article (A) in said gripper mechanism (100),
each one of said centering elements (112) being movable to said raised position for receiving an article (A) from said infeed conveyor (12) through the one of said infeed openings aligned with that one of said centering elements (112).

\* \* \* \* \*